United States Patent
Robin et al.

(10) Patent No.: US 12,449,829 B2
(45) Date of Patent: Oct. 21, 2025

(54) THERMOSTATIC MIXING VALVE FOR SANITARY PURPOSES AND MODULAR ASSEMBLY COMPRISING ONE SUCH MIXING VALVE

(71) Applicant: VERNET, Ollainville (FR)

(72) Inventors: Guillaume Robin, Montgeron (FR); Samuel Marquier, Evry (FR)

(73) Assignee: VERNET, Ollainville (FR)

( * ) Notice: Subject to any disclaimer, the term of this patent is extended or adjusted under 35 U.S.C. 154(b) by 122 days.

(21) Appl. No.: 18/575,814

(22) PCT Filed: Jun. 29, 2022

(86) PCT No.: PCT/EP2022/067907
§ 371 (c)(1),
(2) Date: Dec. 29, 2023

(87) PCT Pub. No.: WO2023/275148
PCT Pub. Date: Jan. 5, 2023

(65) Prior Publication Data
US 2024/0370044 A1  Nov. 7, 2024

(30) Foreign Application Priority Data
Jun. 30, 2021 (FR) .................................... 2107038

(51) Int. Cl.
*G05D 23/13* (2006.01)
*E03C 1/04* (2006.01)
(52) U.S. Cl.
CPC ........... *G05D 23/1353* (2013.01); *E03C 1/04* (2013.01)
(58) Field of Classification Search
CPC .. G05D 23/13; G05D 23/1306; G05D 23/132; G05D 23/134; G05D 23/1346; G05D 23/1353
See application file for complete search history.

(56) References Cited

U.S. PATENT DOCUMENTS

| 6,543,478 B2* | 4/2003 | Kline ................... G05D 23/134 |
| | | 137/543.19 |
| 11,860,647 B2* | 1/2024 | Caleffi ............... G05D 23/1346 |
| 2009/0001178 A1* | 1/2009 | Jarvis ................. G05D 23/1353 |
| | | 236/12.11 |

FOREIGN PATENT DOCUMENTS

EP  2 775 179  9/2014

OTHER PUBLICATIONS

Search Report for FR 2107038, dated Feb. 15, 2022.
International Search Report and Written Opinion for PCT/EP2022/067907, mailed Oct. 28, 2022.

* cited by examiner

*Primary Examiner* — Jonathan Bradford
(74) *Attorney, Agent, or Firm* — MARSHALL, GERSTEIN & BORUN LLP

(57) ABSTRACT

A mixing valve comprising lower, intermediate and upper baseplates stacked along an assembly axis, a thermostatic cartridge and one or more flow members, which is actuatable from the upper face of the upper baseplate. The cartridge is provided with axial hot-water and cold-water inlets, and a mixed water outlet that is transverse to the assembly axis. Each flow member has a mixed water inlet that is transverse to the assembly axis and at least one mixed water outlet. The intermediate baseplate delimits ducts for supplying cold water and hot water, which ducts are respectively connected to the hot-water and cold-water inlet ducts of the lower baseplate and to the hot-water and cold-water inlets of the cartridge, which ducts are each internally provided with a non-return valve. The upper face of the intermediate baseplate and the lower face of the upper baseplate jointly delimit a duct for receiving the mixed water, which duct transversely extends to the assembly axis so as to be (Continued)

connected to the mixed water outlet of the cartridge and the mixed water inlet of each member.

10 Claims, 8 Drawing Sheets

THERMOSTATIC MIXING VALVE FOR SANITARY PURPOSES AND MODULAR ASSEMBLY COMPRISING ONE SUCH MIXING VALVE

FIELD OF THE INVENTION

The present invention relates to a sanitary thermostatic mixing valve. The invention further relates to a modular assembly for sanitary thermostatic mixing valve, comprising such a mixing valve.

BACKGROUND

A mixing valve for sanitary purposes, which is typically used in a sanitary installation, such as a shower, is used for mixing cold water and hot water supplied therein, so as to form mixed water that is sent to the user via one or a plurality of outlets of the mixing valve. The mixing valve for sanitary purposes is called thermostatic when same incorporates a thermostatic assembly, typically a cartridge, apt to regulate the temperature of the mixed water around a set-point value that is set by the user, by varying the respective flow rates of cold water and hot water that are effectively mixed. The mixing valve then incorporates one or a plurality of flow members, to which the mixed water coming out of the thermostatic cartridge is sent and which allow the user to control or even adjust the flow of mixed water coming out of the mixing valve.

In order for water to flow inside the mixing valve from the cold water and hot water inlets to the mixed water outlet(s) via the thermostatic cartridge and the flow member(s), the mixing valve includes a body, generally consisting of a plurality of assembled parts, wherein the thermostatic cartridge and the flow member(s) are mounted and which delimits the different water flow ducts. The body thereby has a water flow architecture of variable complexity, suitable for the thermostatic cartridge, for the flow member(s) and for the requirements of installation of the mixing valve in the sanitary installation concerned. The body can thereby be relatively bulky, which is problematic when it is desired to embed a significant part of the mixing valve into a partition, such as a wall. Moreover, as soon as it is desired to modify the number and/or the type of flow members, it is necessary to completely review the architecture of the body, which is constraining and costly. EP 2 775 179 discloses an example of such a mixing valve for sanitary purposes, comprising a housing, a thermostatic cartridge and a flow member.

SUMMARY

The goal of the present invention is to propose a novel thermostatic mixing valve for sanitary purposes which is particularly compact, practical and economical.

To this end, the subject matter of the invention is a sanitary thermostatic mixing valve, comprising
  lower, intermediate and upper baseplates, which are assembled superimposed along an assembly axis and which each have lower and upper faces axially opposite each other, so that the upper face of the lower baseplate and the lower face of the intermediate baseplate are applied axially against each other and the upper face of the intermediate baseplate and the lower face of the upper baseplate are applied axially against each other,
  a thermostatic cartridge which:
    is assembled to at least one of the lower, intermediate and upper baseplates so that the thermostatic cartridge is actuatable from the upper face of the upper baseplate,
    is provided with a cold water inlet and a hot water inlet, which are axial, and with a mixed water outlet, which is transverse to the assembly axis,
    is suitable for mixing a cold water flow from the cold water inlet of the thermostatic cartridge and a hot water flow from the hot water inlet of the thermostatic cartridge, for forming a mixed water flow sent to the mixed water outlet of the thermostatic cartridge, and
    incorporates a thermostatic regulation member, suitable for regulating the temperature of the mixed water flow by varying respective flow rates of the cold water flow and of the hot water flow, and
  one or more flow members which:
    are assembled to at least one of the lower, intermediate and upper baseplates so that the one flow member or each of the flow members is actuatable from the upper face of the upper baseplate,
    are each provided with a mixed water inlet, which is transverse to the assembly axis, and at least one mixed water outlet, and
    are each suitable for controlling a flow rate of a mixed water flow crossing through the flow member between the mixed water inlet and the at least one mixed water outlet of the flow member,
  wherein the lower baseplate delimits both a cold water inlet duct, a hot water inlet duct and at least one mixed water return duct, all of which open onto the upper face of the lower baseplate,
  the at least one mixed water outlet of the one or more flow members being connected to the at least one mixed water return duct,
  wherein the intermediate baseplate delimits a cold water conveying duct and a hot water conveying duct, which:
    each connect the lower and upper faces of the intermediate baseplate to each other,
    are, at the lower face of the intermediate baseplate, abutted against the cold water and hot water inlet ducts, respectively,
    are, at the upper face of the intermediate baseplate, abutted against the hot and cold water inlets, respectively, of the thermostatic cartridge, and
    are each internally fitted with a non-return valve,
  and wherein the upper face of the intermediate baseplate and the lower face of the upper baseplate jointly delimit a mixed water passage duct, which extends lengthwise transversely to the assembly axis so that, at one of the two opposite longitudinal ends of the mixed water passage duct, the mixed water passage duct is abutted against the mixed water outlet of the thermostatic cartridge, while at the other of the two opposite longitudinal ends of the mixed water passage duct, the mixed water passage duct is abutted against the mixed water inlet of the one flow member or of each of the flow members.

One of the ideas underlying the invention is to combine a thermostatic cartridge, with axial inlets and with a transverse outlet, and one or a plurality of flow members with a transverse inlet, with at least three baseplates which are superimposed along an assembly axis and which jointly define the architecture of the different ducts needed for the flow of water within the mixing valve, in a clever way in order to limit the total axial dimension of the three baseplates and, consequently, the depth of embedding of the mixing valve according to the invention. More particularly, the invention provides that non-return valves are arranged directly under the thermostatic cartridge, by means of the axial inlets of the latter. The invention also provides that, in order to avoid losing space along the assembly axis, the mixed water leaving the thermostatic cartridge laterally to the latter flows as far as the transverse inlet of the flow member or members in a supply duct, which extends lengthwise transversely to the assembly axis and which is delimited jointly by the upper face of the intermediate baseplate and the lower face of the upper baseplate. The mixing valve according to the invention thereby proves to be particularly compact.

Moreover, the design with the three superposed baseplates according to the invention offers many practical and economic advantages. More particularly, the design can be modular, by providing that the lower baseplate is common to different embodiments of the intermediate and upper baseplates, where the different embodiments can in particular be associated with different numbers and/or types, respectively, for the flow member or members. Moreover, the intermediate and upper baseplates can be provided to be demoldable along the assembly axis, which makes the baseplate or the baseplates easy to design and practical to manufacture, in particular by die-casting or injection molding. In addition, the intermediate baseplate can be made of a plastic material, which leads to many advantages, such as saving in weight, reducing cost, facilitating the integration of non-return valves, as well as that of grooves receiving seals provided at the interfaces between the intermediate baseplate and the lower and upper baseplates, and providing thermal insulation between the lower baseplate, wherein hot water is taken in, and the upper baseplate, which is typically accessible to the user.

According to advantageous additional features of the mixing valve according to the invention:

The intermediate baseplate is made of a plastic material.

The intermediate baseplate is designed to be demoldable along the assembly axis.

The upper baseplate is designed to be demoldable along the assembly axis.

The mixed water passage duct is formed axially recessed in the lower face of the upper baseplate.

The mixed water passage duct is formed axially recessed in the upper face of the intermediate baseplate.

The cold water and hot water conveying ducts extend parallel to the assembly axis from the lower face to the upper face of the intermediate baseplate.

The at least one mixed water outlet of the one flow member or of each of the flow members is, at the upper face of the intermediate baseplate, abutted against a mixed water outlet duct which:

is delimited by the intermediate baseplate so as to connect the lower and upper faces of the intermediate baseplate, extends parallel to the assembly axis from the lower face to the upper face of the intermediate baseplate, and is, at the lower face of the intermediate baseplate, abutted against the at least one mixed water return duct.

The upper baseplate delimits mounting openings:

in which the thermostatic cartridge and the one or more flow members are assembled, which connect the lower and upper faces of the upper baseplate to each other, and which extend parallel to the assembly axis from the lower face to the upper face of the upper baseplate.

A further subject matter of the invention is a modular assembly for sanitary thermostatic mixing valve, comprising:

a mixing valve, which is as defined above, the intermediate baseplate, the upper baseplate and the one or more flow members of the mixing valve forming a first intermediate baseplate, a first upper baseplate and one or more first flow members, respectively, one or more second flow members, which are suitable for controlling a flow rate of a mixed water flow crossing therethrough between a mixed water inlet and at least one mixed water outlet of the one second flow member or of each of the second flow members, and which differ, in number and/or type, from the one or more first flow members, and a second intermediate baseplate and a second upper baseplate, which can be assembled to the lower baseplate of the mixing valve in place of the first intermediate and upper baseplates, and which differ from the first intermediate and upper baseplates, respectively, by features specific to assembling and connecting the second intermediate and upper baseplates with the one or more second flow members.

BRIEF DESCRIPTION OF THE DRAWINGS

The invention will be better understood upon reading the following description, given only as an example and making reference to the drawings, wherein.

DETAILED DESCRIPTION

Figure 1:
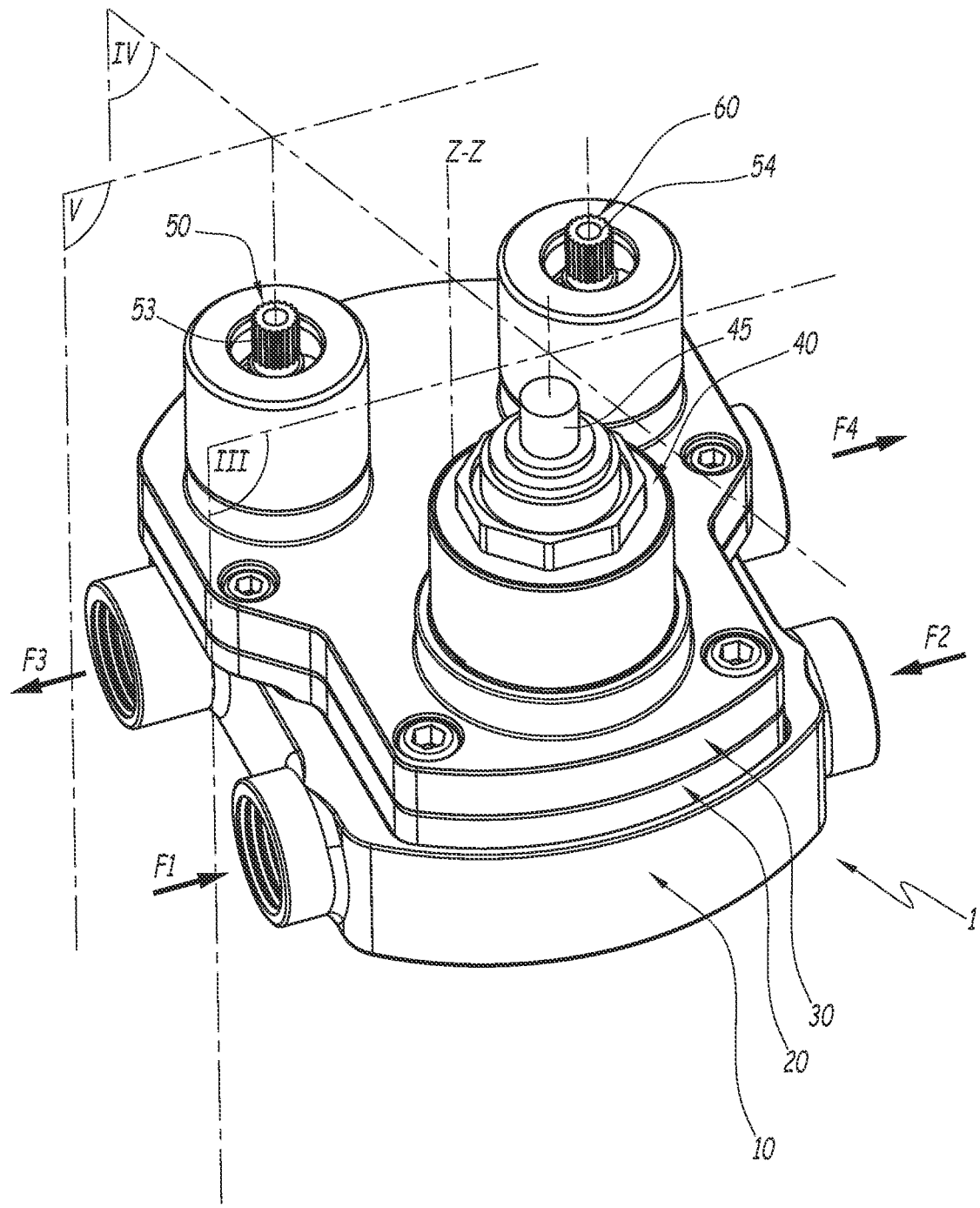
FIG. 1 is a perspective view of a mixing valve according to the invention.

FIGS. 1 to 7 show a sanitary thermostatic mixing valve 1 for a sanitary installation, such as a shower, a bathtub, a sink, etc. As explained in more detail thereafter, the mixing valve 1 is intended to be partly embedded in a support of the installation, in particular in a wall, a partition, a box, etc. Once fitted, the mixing valve 1 remains partly accessible to a user so that the latter can manually actuate the mixing valve 1.

In all cases, the mixing valve 1 is designed to be supplied by an incoming flow of cold water F1 and an incoming flow of hot water F2 and is designed to deliver one or a plurality of outgoing flows of mixed water, namely, herein, two outgoing flows of mixed water F3 and F4, where it should be noted that the mixed water of the outgoing flow(s) results from mixing, in the mixing valve 1, controlled proportions of the incoming flows of cold water F1 and of hot water F2, respectively. "Cold water" means unheated running water, which is generally at a temperature slightly less than or equal to room temperature. Hot water means running water which has been heated by a plumbing heating system. In practice, hot water has a higher temperature than cold water. Therefore, the mixed water resulting from mixing the incoming flows of cold water F1 and hot water F2 by mixing valve 1 has an intermediate temperature between the temperatures of cold water and hot water, which depends on the respective controlled proportions of the incoming flows which are effectively mixed by the mixing valve 1.

As can be seen clearly in FIGS. 1 to 5, the mixing valve 1 comprises three baseplates 10, 20 and 30 which are assembled rigidly to one another, being superposed along an assembly axis Z-Z. The baseplate 20 is arranged between the baseplates 10 and 30 along the assembly axis Z-Z. For convenience, the baseplates 10, 20 and 30 are referred to as a lower baseplate, an intermediate baseplate and an upper baseplate, respectively. In practice, when the mixing valve 1 is embedded in such a way that the assembly axis Z-Z extends vertically, the lower baseplate 10 is situated vertically under the intermediate baseplate 20 which is as such situated vertically under the upper baseplate 30. The vertical orientation of the Z-Z assembly axis is illustrated in the figures. Such being the case, the mixing valve 1 can also be embedded in such a way that the assembly axis Z-Z extends at an angle with respect to the vertical, or even extends horizontally, so that the lower baseplate 10 does not find as such entirely located below the intermediate baseplate 20 which, as such, is not completely located below the upper baseplate 30. Thereby, the terms "lower", "upper" and similar terms, which are used to describe the mixing valve 1 should not be understood strictly but are simply oriented with respect to the assembly axis Z-Z the orientation of which with respect to the vertical is not predetermined but depends on the arrangement wherein the mixing valve 1 is embedded.

In all cases, each of the lower 10, intermediate 20 and upper 30 baseplates has two faces which are opposite to each other along the assembly axis Z-Z, namely a lower face 10A, 20A, 30A and an upper face 10B, 20B, 30B. It should be noted that the term "face" is understood herein in a broad sense, namely that of "side", and is thus not limited to a plane geometry; similarly, the opposite faces of the same baseplate among the baseplates 10, 20 and 30 are not necessarily parallel to each other. In the assembled state of the mixing valve 1 like in FIGS. 1 and 3 to 5, the upper face 10B of the lower baseplate 10 and the lower face 20A of the intermediate baseplate 20 are applied against each other along the assembly axis Z-Z and the upper face 20B of the intermediate baseplate 20 and the lower face 30A of the upper baseplate 30 are also applied against each other along the assembly axis Z-Z. In practice, the means of the mixing valve 1 which ensure the assembly of the baseplates 10, 20 and 30 are not limiting insofar as same hold the baseplates 10, 20 and 30 rigidly in place in a superposed way along the assembly axis Z-Z, with axial abutment between the faces 10B and 20A and between the faces 20B and 30A, whatever the geometry of variable complexity of the faces 10B, 20A, 20B and 30A. In the example of embodiment considered in the figures, the baseplates 10, 20 and 30 are thereby assembled by bolting.

When the mixing valve 1 is embedded, the baseplates 10, 20 and 30 are designed to be embedded into the aforementioned support of the sanitary installation, with a maximum embedding depth which corresponds to the maximum distance separating, along the assembly axis Z-Z, the lower face 10A of the lower baseplate and the upper face 30B of the upper baseplate 30. Thereby, when the mixing valve 1 is embedded in the aforementioned support, the baseplates 10, 20 and 30 can be completely embedded, except for all or part of the upper face 30B of the upper baseplate, which remains directly accessible to a user of the mixing valve 1.

According to an advantageous embodiment, which is particularly compact and which is implemented in the example considered in the figures, each of the lower 10, intermediate 20 and upper 30 baseplates has the shape of a plate the dimension of which corresponding to the thickness, is oriented along the assembly axis Z-Z. In the assembled state of the mixing valve 1, the upper face 10B of the lower baseplate 10 and the lower face 20A of the intermediate baseplate 20 form a contact interface, which is flat and extends perpendicularly to the assembly axis Z-Z. The contact interface consists of respective parts of the aforementioned faces 10B and 20A, which are pressed against each other in a flat contact. Similarly, the upper face 20B of the intermediate baseplate 20 and the lower face 30A of the upper baseplate 30 form a contact interface, which is flat and which is perpendicular to the assembly axis Z-Z. The contact interface consists of respective parts of the aforementioned faces 20B and 30A, which are pressed against each other in a flat contact.

Before the baseplates 10, 20 and 30 are described in greater detail, it should be noted that the mixing valve 1 also comprises a thermostatic cartridge 40 and two flow members 50 and 60. As discussed in detail thereafter, the thermostatic cartridge 40 and the flow members 50 and 60 are assembled to at least one of the baseplates 10, 20 and 30 so that the thermostatic cartridge 40 and the flow members 50 and 60 can be actuated by the user from the upper face 30B of the upper baseplate 30. In the example of embodiment considered in the figures, the thermostatic cartridge 40 and the flow members 50 and 60 are thereby designed to emerge each partially from the upper face 30B of the upper base 30: thereby, as is clearly visible in FIGS. 1 and 3 to 5, the thermostatic cartridge 40 and the flow members 50 and 60 each rise partially above, along the assembly axis Z-Z, the upper face 30B of the upper base 30, so that, when the mixer 1 is embedded, the respective corresponding parts of the thermostatic cartridge and of the flow members are directly accessible to the user of the mixer for manual actuation of the parts. In a variant (not shown), the thermostatic cartridge 40 and/or one and/or the other of the flow members 50 and 60 are arranged entirely below the upper face 30B of the upper baseplate 30 but remain accessible to the user through the latter by means of dedicated elements allowing the user to actuate same manually from the upper face 30B of the upper baseplate 30.

Figure 3:
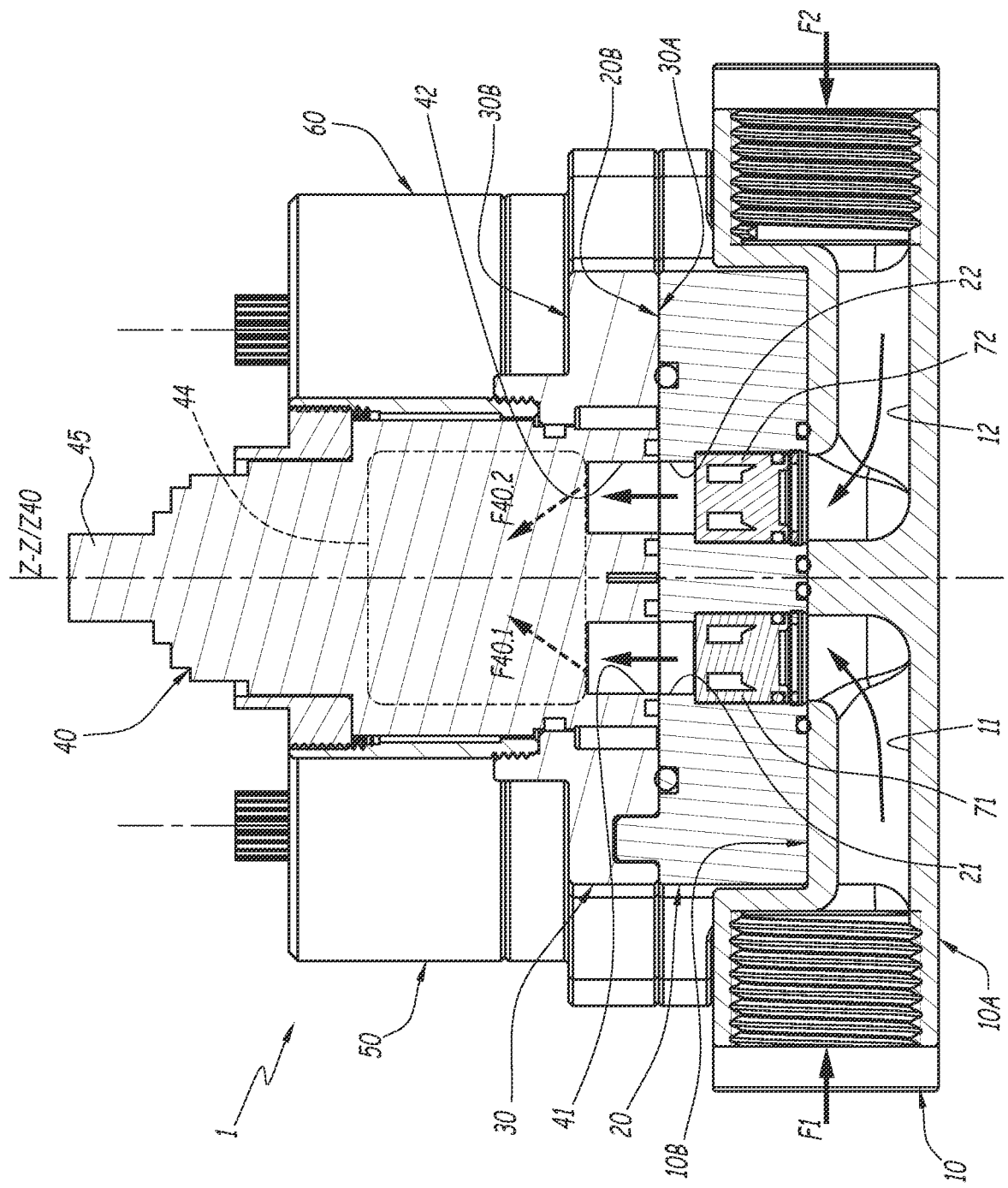
FIG. 3 is a section in the plane III shown in FIG. 1.
Figure 4:
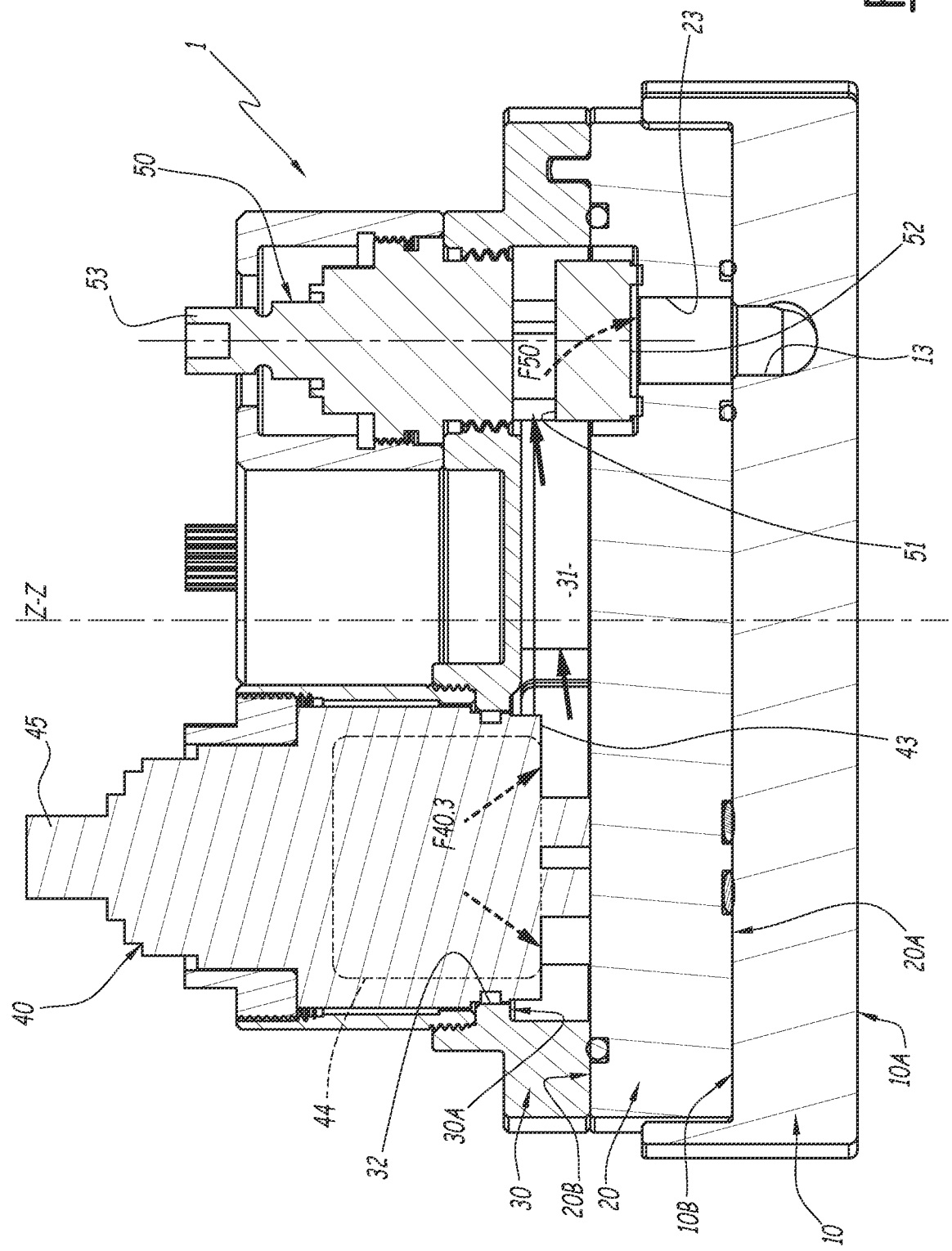
FIG. 4 is a section in the plane IV shown in FIG. 1.

As shown schematically in FIGS. 3 and 4, the thermostatic cartridge 40 is suitable for mixing a cold water flow F40.1 coming from a cold water inlet 41 of the thermostatic cartridge, and a hot water flow F40.2, coming from a hot water inlet 42 of the thermostatic cartridge, so as to form a mixed water flow F40.3, sent to a mixed water outlet 43 of the thermostatic cartridge. The thermostatic cartridge 40 is also suitable for thermostatically regulating the temperature of the mixed water flow F40.3: to this end, the thermostatic cartridge 40 incorporates a thermostatic control member 44 apt to regulate the temperature of the mixed water flow F40.3 around a set value, by varying the respective flow rates of the cold water flow F40.1 and the hot water flow F40.2. The aforementioned set value is adjusted by the user, by means of the manual actuation by the latter of an adjustment element 45 belonging to the thermostatic cartridge 40, more precisely to the part of the latter which, in service, remains accessible to the user from the upper face 30B of the upper baseplate. As a preferred example, the thermostatic adjustment member 44 comprises a thermostatic element, such as same marketed by VERNET (France), having a piston the position of which is fixed by the adjustment member 45 and on which a cup is mounted so as to slide, which contains a thermally expandable material acting on the piston and which supports a valve which controls, in respective inverse proportions, the respective flow rates of the flows of cold water F40.1 and hot water F40.2, mixed downstream of the valve. Nevertheless, multiple embodiments are conceivable for the thermostatic regulation member 44, which explains why the latter is only shown schematically in FIGS. 3 and 4.

In all cases, the thermostatic cartridge 40 has the specificity that, in the assembled state of the mixing valve 1, the cold water inlet 41 and hot water inlet 42 thereof are axial, i.e. oriented along the assembly axis Z-Z, while the mixed water outlet 43 thereof is transverse to the assembly axis Z-Z. Thereby, as is clearly visible in FIG. 3, each of the cold water 41 and hot water 42 inlets is generally centered on a geometric axis which extends parallel to the assembly axis Z-Z: to enter the thermostatic cartridge 40, the cold water flows into the cold water inlet 41 parallel to the axis Z-Z and the hot water flows into the hot water inlet 42 parallel to the assembly axis Z-Z. On the other hand, the mixed water outlet 43 is arranged laterally to the thermostatic cartridge 40, being oriented transversely or even perpendicularly to the assembly axis Z-Z: in order to leave the thermostatic cartridge 40, the mixed water flows into the mixed water outlet 43 along a transverse direction, or even perpendicular to the assembly axis Z-Z, as can be seen clearly in FIG. 4.

In practice, the thermostatic cartridge 40 can be produced according to multiple non-limiting embodiments, provided that the latter have the specificity just described hereinabove. Examples of embodiments of the thermostatic cartridge 40 are known in the art: one example is presented in detail in the French patent application FR2006150; another example corresponds to the cartridge marketed by VERNET (France) under the reference VT40SL.

Figure 2:
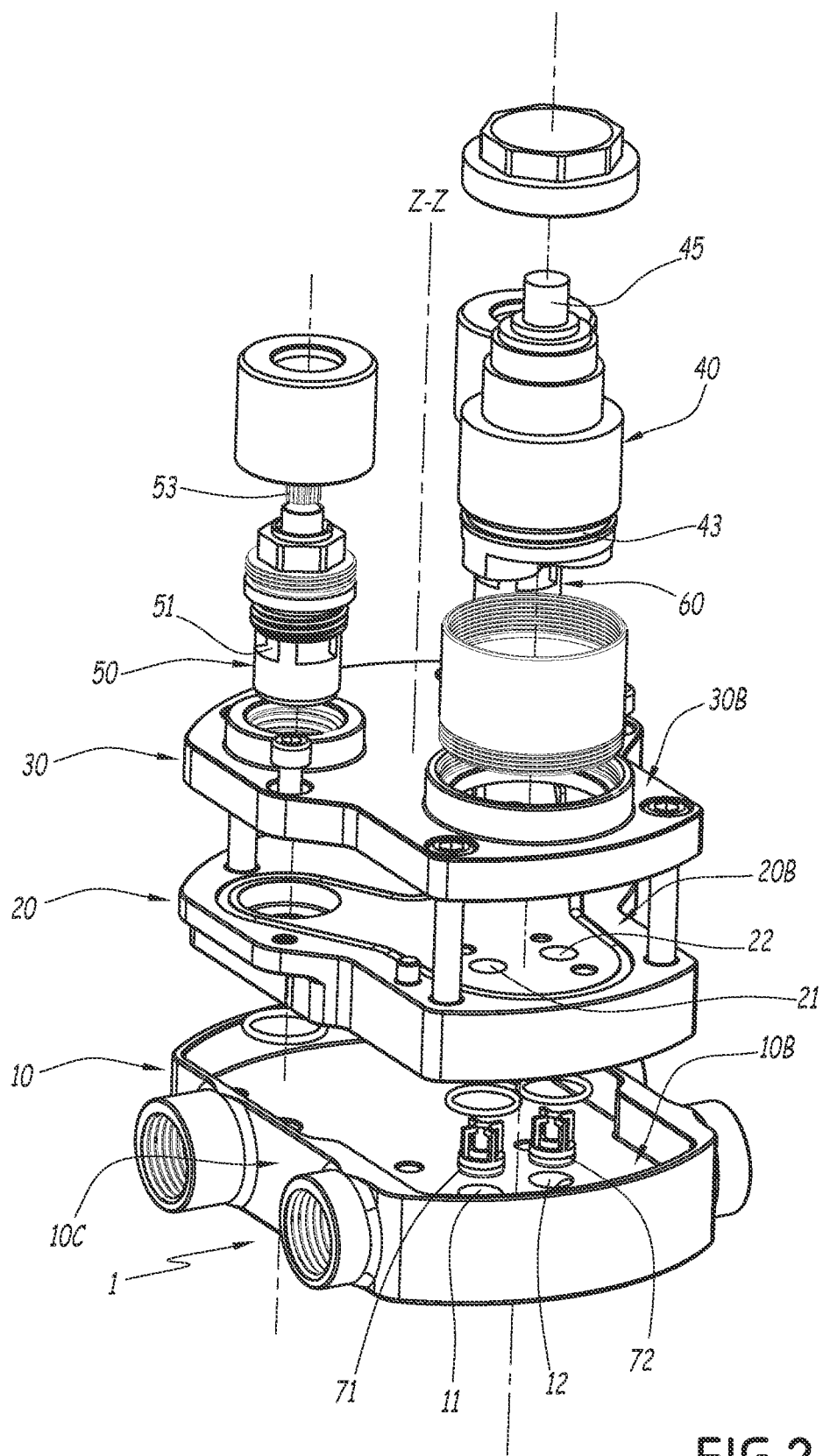
FIG. 2 is an exploded perspective view of the mixing valve shown in FIG. 1.

Whatever the embodiment thereof, the thermostatic cartridge 40 advantageously forms a preassembled unit which is attached in one piece to the rest of the mixing valve 1, in particular for the purpose of assembling same to the baseplates 10, 20 and 30, as illustrated in FIG. 2.

With regard to the flow members 50 and 60, each of them is suitable for controlling the flow of a mixed water flow F50, F60, which flows through the flow member 50, 60, between a mixed water inlet 51, 61 and a mixed water outlet 52, 62 of the corresponding flow member. Each flow member 50, 60 thereby allows a user to let through or interrupt the flow of the mixed water flow F50, F60 through the corresponding flow member and, in the case where the flow is let through, advantageously allows the flow rate with which the mixed water flow F50, F60 exits the corresponding flow member, to be adjusted. In practice, the embodiment of the flow members 50 and 60 is not limiting since each of the flow members 50 and 60 includes, in the part thereof which, in service, remains accessible to the user from the upper face 30B of the upper baseplate, an actuating element 53, 63 that the user actuates manually so that the flow member controls in a corresponding way, the flow rate of the mixed water flow F50, F60. As an example, in the embodiment considered in the figures, the flow members 50 and 60 are identical to each other and each of them is a tap head. Other embodiments, well known in the sanitary field, can be envisaged for one and/or the other of the flow members 50 and 60. In practice, each flow member 50, 60 advantageously forms a preassembled unit, which is attached in one piece to the rest of the mixing valve 1, in particular for the purpose of assembling same to the baseplates 10, 20 and 30.

In all cases, each flow member 50, 60 has the specificity that the mixed water inlet 51, 61 thereof is transverse, or even perpendicular, to the assembly axis Z-Z. Thereby, each mixed water inlet 51, 61 is arranged laterally to the corresponding flow member 50, 60, being oriented along a direction which is transverse, or even perpendicular, to the assembly axis Z-Z: to enter each flow member 50, 60, the mixed water flows into the mixed water inlet 51, 61 transversely, or even perpendicularly, to the assembly axis Z-Z, as can be seen clearly in FIG. 4.

Figure 5:
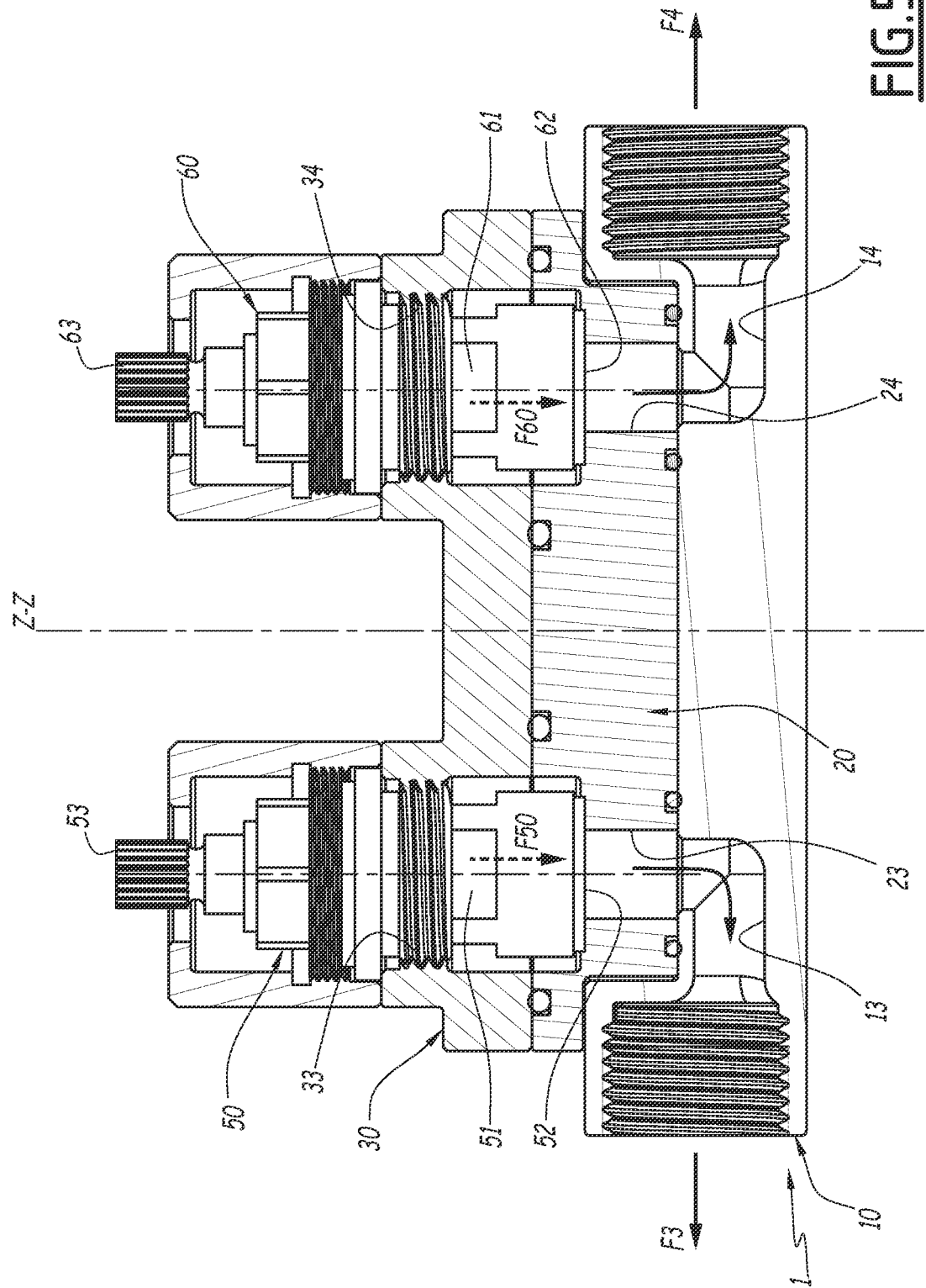
FIG. 5 is a section in the plane V shown in FIG. 1.
Figure 6:
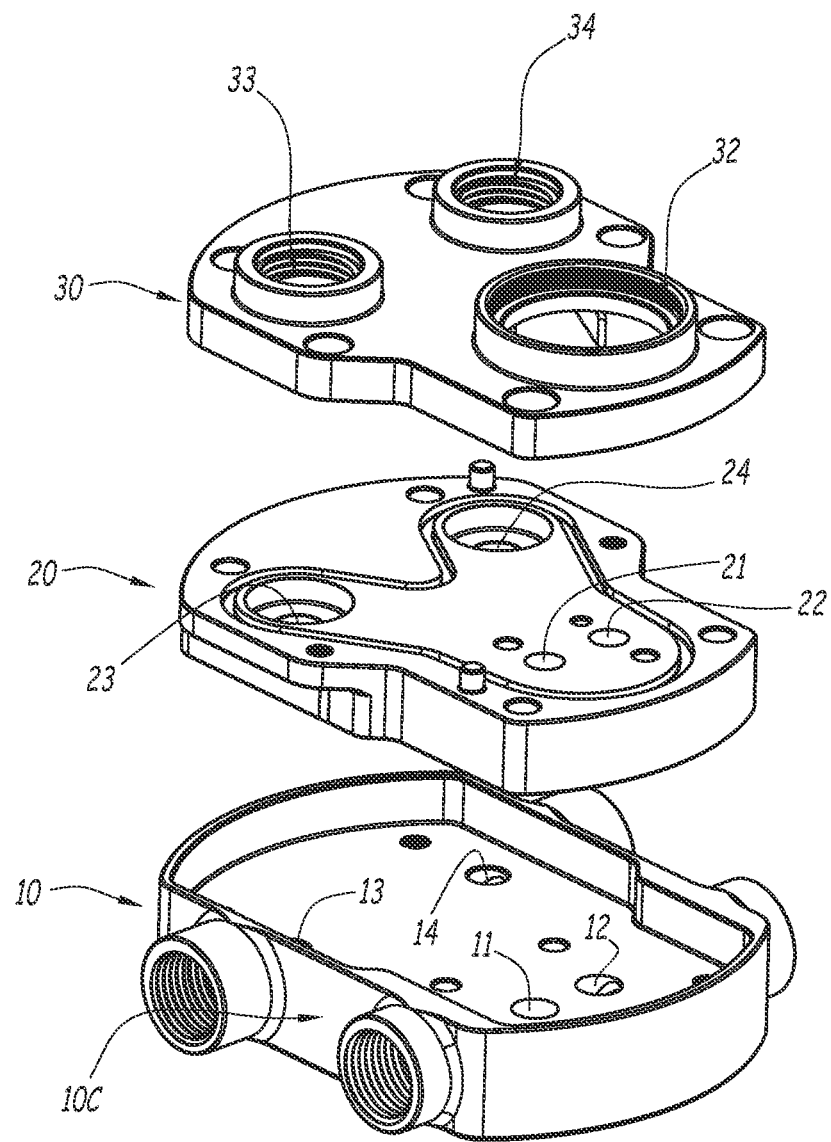
FIG. 6 is an exploded perspective view of three baseplates belonging to the mixing valve shown in the previous figures.

In addition, in the embodiment considered in FIGS. 1 to 7, the mixed water outlet 52, 62 of each of the flow members 50, 60 is axial, i.e. oriented along the direction of the assembly axis Z-Z, as can be seen clearly in FIG. 5. Thereby, each of the mixed water outlets 52 and 62 is centered on a geometric axis which extends parallel to the assembly axis Z-Z: to leave the flow member 50, 60, the mixed water flows into the mixed water outlet 52, 62, parallel to the assembly axis Z-Z.

According to a preferred arrangement, the interest of which will be clear later and which is implemented in the embodiment considered in the figures, the cold water inlets 41 and hot water inlets 42 are arranged diametrically opposite with respect to a central axis Z40 of the thermostatic cartridge 40, which extends parallel to the assembly axis Z-Z, as can be seen clearly in FIG. 3.

Returning now to the description of the baseplates 10, 20 and 30, we will focus thereafter on the arrangements of the latter, which allow cold water and hot water supplying the mixing valve 1, in the form of the incoming flows F1 and F2, to reach the thermostatic cartridge 40, then the flow members 50 and 60, before exiting the mixing valve 1 in the form of the mixed water outlet flows F3 and F4. In other words, the flow architecture defined by the baseplates 10, 20 and 30 will now be described in greater detail both with respect to one another and with respect to the thermostatic cartridge 40 and the flow members 50 and 60.

As can be seen clearly in FIGS. 2 to 7, the lower baseplate 10 delimits a plurality of ducts, all of which open onto the upper face 10B of the lower baseplate 10 and which, opposite the opening thereof onto the upper face 10B, advantageously open onto a lateral face 10C of the lower baseplate 10, which connects the lower 10A and upper 10B faces of the latter to each other. The ducts of the lower baseplate 10 are:

- a cold water inlet duct 11 through which the incoming cold water flow F1 flows to the upper face 10B of the lower baseplate 10, after having penetrated inside the mixing valve 1 via the outlet of the cold water inlet duct 11 on the lateral face 10C,
- a hot water inlet duct 12 through which the incoming hot water flow F2 flows to the upper face 10B of the lower baseplate 10, after having penetrated inside the mixing valve 1 via the outlet of the hot water inlet duct 12 on the lateral face 10C, and
- two mixed water return ducts 13 and 14 through which the outgoing mixed water flows F3 and F4 respectively flow from the upper face 10B of the lower baseplate 10, until leaving the mixing valve 1 via the respective outlets of the mixed water return ducts 13 and 14 on the side face 10C.

In the embodiment considered in the figures, the lower face 10A of the lower baseplate 10 is thereby devoid of an opening for the passage of water, which advantageously makes it possible to satisfy the embedding requirements to which the mixing valve 1 is subjected. Nevertheless, in a variant (not shown), the connection of the lower baseplate 10 with the incoming flows F1 and F2 and/or the outgoing flows F3 and F4 may not be exclusively lateral like in the figures. In all cases, the respective outlets of the ducts 11, 12, 13 and 14, which are opposite the upper face 10B of the lower baseplate 10, are advantageously provided with fittings for connection to pipes (not shown), wherein flow the flows F1 to F4, respectively: in the example illustrated in the figures, the outlets of the ducts 11 to 14 are thereby tapped.

Also, as can be seen clearly in FIGS. 2 to 7, the intermediate baseplate 20 delimits a plurality of ducts, each of which connects the lower and upper faces 20A and 20B of the intermediate baseplate to one another, and which advantageously each extends parallel to the assembly axis Z-Z from the lower face 20A to the upper face 20B. The ducts of the intermediate baseplate 20 are:

- a cold water supply duct 21 and a hot water supply duct 22, which, at the lower face 20A of the intermediate baseplate 20, are abutted against the cold water supply duct 11 and the hot water supply duct 12, respectively, of the lower baseplate 10, and which, at the upper face 20B of the intermediate baseplate 20, are abutted against the cold water inlets 41 and hot water inlets 42, respectively, of the thermostatic cartridge 40, and
- two mixed water discharge ducts 23 and 24, which, at the lower face 20A of the intermediate baseplate 20, are abutted against the mixed water return ducts 13 and 14, respectively, and which, at the upper face 20B of the intermediate baseplate 20, are abutted against the mixed water outlet 52 of the flow member 50 and to the mixed water outlet 62 of the flow member 60, respectively.

The cold water inlet duct 11 of the lower baseplate 10 and the cold water supply duct 21 of the intermediate baseplate 20 are placed end to end, being directly connected to each other parallel to the assembly axis Z-Z, and the corresponding connection between the two ducts is advantageously sealed by a gasket which surrounds the corresponding abutment zone. What has just been described for the abutment of the ducts 11 and 21 is similar for:

- the hot water inlet duct 12 of the lower baseplate 10 and the hot water supply duct 22 of the intermediate baseplate 20,
- the mixed water return duct 13 of the lower baseplate 10 and the mixed water discharge duct 23 of the intermediate baseplate 20,
- the mixed water return duct 14 of the lower baseplate 10 and the mixed water discharge duct 24 of the intermediate baseplate 20,
- the cold water supply duct 21 of the intermediate baseplate 20 and the cold water inlet 41 of the thermostatic cartridge 40,
- the hot water supply duct 22 of the intermediate baseplate 20 and the hot water inlet 42 of the thermostatic cartridge 40,
- the mixed water discharge duct 23 of the intermediate baseplate 20 and the mixed water outlet 52 of the flow member 50, and
- the mixed water discharge duct 24 of the intermediate baseplate 20 and the mixed water outlet 62 of the flow member 60.

As can be seen clearly in FIGS. 2 and 3, a non-return valve 71 is arranged inside the cold water conveying duct 21 of the intermediate baseplate 20. Similarly, a non-return valve 72 is arranged in the hot water conveying duct 22. In other words, the cold water conveying duct 21 is internally provided with the non-return valve 71 and the hot water conveying duct 22 is internally provided with the non-return valve 72. The arrangement of the non-return valves 71 and 72 thus takes advantage of the presence of the intermediate baseplate 20, occupying all or part of the thickness of the latter along the assembly axis Z-Z. Moreover, the non-return valves 71 and 72 are thereby directly arranged below the thermostatic cartridge 40, being correspondingly aligned, parallel to the assembly axis Z-Z, with the axial water inlets 41 and 42 of the thermostatic cartridge 40. Incidentally, it should be understood that the water inlets 41 and 42 are diametrically opposite with respect to the central axis Z40 of the thermostatic cartridge 40, since the non-return valves 71 and 72 can then be separated as far as possible from each other in a geometrical plane perpendicular to the assembly axis Z-Z, which facilitates the installation thereof side by side, as can be seen clearly in FIG. 3.

According to an advantageous embodiment, the intermediate baseplate 20 is made of a plastic material while the lower baseplate 10 and upper baseplate 30 are then preferentially made of a metallic material, in particular an alloy such as brass. By making the intermediate baseplate 20 of a plastic material, the weight and cost of the mixing valve 1 are reduced. In addition, the intermediate baseplate 20 then provides thermal insulation between the lower baseplate 10, which, as discussed in detail hereinabove, receives the incoming flow of hot water F2, and the upper baseplate 30, which, as explained hereinabove, remains at least partially accessible to the user when the mixing valve 1 is embedded. Moreover, by making the intermediate baseplate 20 of plastic material, the integration of the non-return valves 71 and 72 in the cold water 21 and hot water 22 supply ducts is facilitated, just like the integration of grooves receiving gaskets on the lower face 20A and/or the upper face 20B of the intermediate baseplate 20, thereby preventing from having to machine such grooves in the lower 10 and upper 30 baseplates.

Taking into account the above with regard to the intermediate baseplate 20, it will be understood that the latter can be advantageously demolded along the assembly axis Z-Z. Indeed, the different arrangements of the latter described hitherto, in particular the ducts 21 to 24 thereof which extend parallel to the axis Z-Z over the entire corresponding dimension of the intermediate baseplate, can be shaped so as not to have an undercut which would prevent a direct demolding along the axis Z-Z. Such a demoldability of the intermediate baseplate 20 facilitates the design thereof and reduces the manufacturing time and cost thereof. More particularly, the intermediate baseplate 20 can then either be stamped when same is made of a metal material, or injected into a mold without a lost core when same is made of a plastic material.

Figure 7:
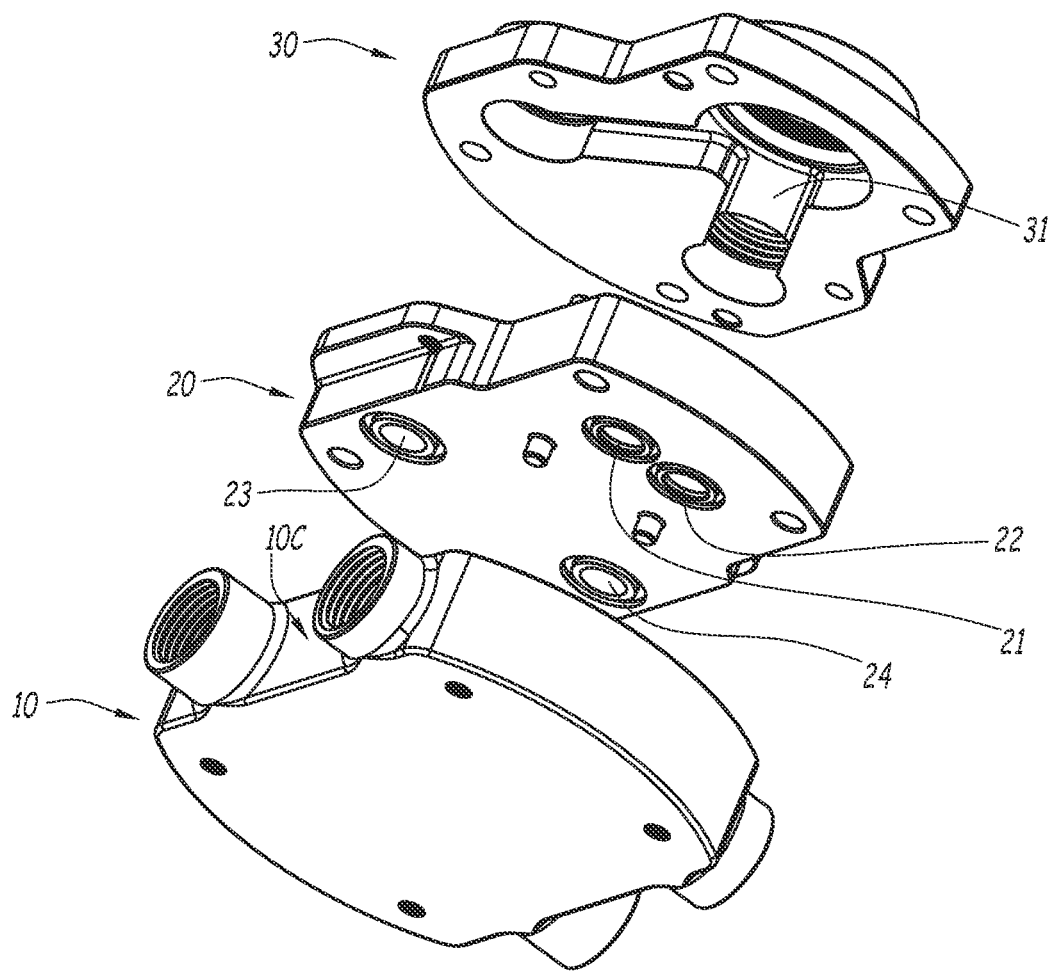
FIG. 7 is a view similar to FIG. 6, from a different angle of observation.

As can be seen clearly in FIGS. 4 and 7, a mixed water passage duct 31 is provided for connecting the mixed water outlet 43 of the thermostatic cartridge 40 to the mixed water inlets 51 and 61 of the flow members 50 and 60. The mixed water passage duct 31 is delimited jointly by the upper face 20B of the intermediate baseplate 20 and the lower face 30A of the upper baseplate 30, advantageously being sealed by a peripheral gasket interposed between the faces 20B and 30A. In the example of embodiment considered in the figures, the mixed water passage duct 31 is recessed, along the assembly axis Z-Z, in the lower face 30A of the upper baseplate 30 and is closed, at the upper face 20B of the intermediate baseplate 20, by a part of the upper face 20B, which is flush with the contact interface between the intermediate 20 and upper 30 baseplates. In a variant (not shown), the mixed water passage duct can also be partially or completely formed axially recessed in the upper face 20B of the intermediate baseplate 20.

In all cases, the mixed water passage duct 31 extends lengthwise transversely or even, like herein, perpendicularly to the assembly axis Z-Z, so that, at one of the two opposite longitudinal ends of the mixed water passage duct 31, the latter abuts against the mixed water outlet 43 of the thermostatic cartridge 40 while, at the other of two opposite longitudinal ends thereof, the mixed water passage duct 31 abuts against the mixed water inlets 51 and 61 of the flow members 50 and 60. In the embodiment considered herein, the mixed water passage duct 31 has, as is clearly visible in FIG. 7, a V-shaped profile and thereby includes two corresponding branches, namely, a first branch which extends from the mixed water outlet 43 of the thermostatic cartridge 40 to the mixed water inlet 51 of the flow member 50 and a second branch which extends from the mixed water outlet 43 to the mixed water inlet 61 of the flow member 60. In all cases, the arrangement of the mixed water passage duct 31 is adapted to the fact that the mixed water outlet 43 and the mixed water inlets 51 and 61 are transverse or even perpendicular to the assembly axis Z-Z.

Furthermore, the upper baseplate 30 delimits mounting openings 32, 33 and 34 wherein the thermostatic cartridge 40 and the flow members 50 and 60, respectively, are assembled. As can be seen clearly in FIGS. 3 to 5, each of the mounting openings 32 to 34 connects the lower face 30A and upper face 30B of the upper baseplate 30 to each other and extends parallel to the assembly axis Z-Z from the lower face 30A to the upper face 30B. In the assembled state of the mixing valve 1, the thermostatic cartridge 40 and the flow members 50 and 60 are respectively received and fastened in the mounting openings 32 to 34 so that the respective parts of the thermostatic cartridge 40 and the flow members 50 and 60, facing axially towards the lower baseplate 10, are connected to the ducts 21 to 24 and 31, as described in detail hereinabove, while the respective opposite parts of the thermostatic cartridge 40 and of the flow members 50 and 60 remain accessible to the user of the mixing valve 1, by emerging from the upper face 30B of the upper baseplate 30. In practice, the fittings of the mixing valve 1, which ensure the fastening of the thermostatic cartridge 40 and of the flow members 50 and 60 in the mounting openings 32 to 34 of the upper baseplate 30, are not limiting and will thus not be described further herein.

According to considerations similar to the considerations developed hereinabove in connection with the demoldability of the intermediate baseplate 20, the upper baseplate 30 is also advantageously demoldable along the axis Z-Z. Indeed, the different fittings of the upper baseplate 30 described hitherto, in particular the mixed water passage duct 31 which is formed axially recessed in the lower face 30A of the upper baseplate 30, can be shaped so as not to have an undercut which would prevent a direct demolding along the axis Z-Z.

In operation, the user acts on the accessible part of the thermostatic cartridge 40, in particular on the adjustment element 45 thereof, to actuate the thermostatic cartridge 40 in order to choose the setpoint value for the temperature of the mixed water. The user also acts on the accessible part of the flow member 50, in particular on the actuating element 53 thereof, to actuate the flow member 50 in order to control the flow rate, which could be, if appropriate, zero, for the outgoing flow of mixed water F3. Similarly, the user acts on the accessible part of the flow member 60, in particular on the actuating element 63 thereof, to actuate the flow member 60 in order to control the flow rate, which could be, if appropriate, zero, for the outgoing flow of mixed water F4.

Thereby, when one and/or the other of the flow members is actuated in order to have a non-zero flow rate for the outgoing flow of mixed water F3 and/or the outgoing flow of mixed water F4, the cold water enters the mixing valve 1 in the form of the incoming cold water flow F1 and circulates in the cold water inlet duct 11 and then in the cold water conveying duct 21, until same reaches, axially, the cold water inlet 41 of the thermostatic cartridge 40. Similarly, the hot water enters the mixing valve 1 in the form of the incoming hot water flow F2 and circulates in the hot water inlet duct 12 and then in the hot water conveying duct 22, until same reaches, axially, the hot water inlet 42 of the thermostatic cartridge. Inside the thermostatic cartridge 40, all or part of the incoming cold water flow F1 and all or part of the incoming hot water flow F2 pass downstream of the thermostatic control unit 44, forming the cold water flow F40.1 and the hot water flow F40.2, respectively, then mixing for forming the mixed water flow F40.3. The non-return valve 71 prevents hot water from entering the cold water inlet duct 11 and the non-return valve 72 prevents cold water from entering the hot water inlet duct 12. The mixed water flow F40.3 exits the thermostatic cartridge 40 transversely or even perpendicularly to the assembly axis Z-Z via the mixed water outlet 43 of the latter, then flows into the mixed water passage duct 31 until same reaches the mixed water inlets 51 and 61 of the flow members 50 and 60, where the mixed water flow F40.3 enters transversely, or even perpendicularly, into the flow members 50 and 60. Inside the flow components 50 and 60, all or part of the mixed water flow F40.3 crosses through the flow components, by forming the mixed water flows F50 and F60 which then exit axially from the flow members 50 and 60, for forming the mixed water outgoing flows F3 and F4, respectively, which exit the mixing valve 1 after the mixed water outgoing flow F3 has flowed into the discharge duct 53 and the mixed water return duct 13 and after the mixed water outflow F4 has flowed into the mixed water discharge duct 24 and the mixed water return duct 14.

Figure 8:
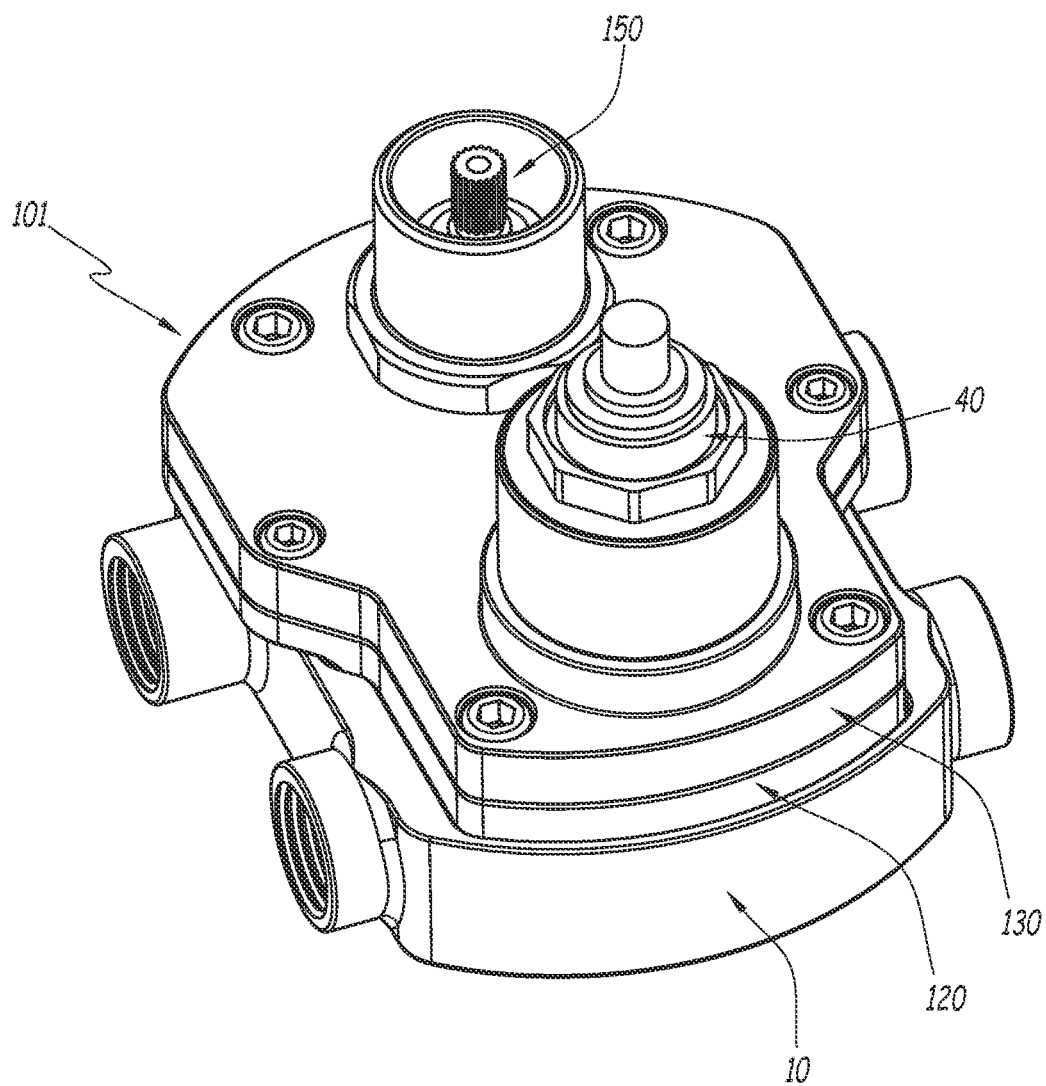
FIG. 8 is a view similar to FIG. 1, illustrating a mixing valve according to the invention but according to an embodiment different from the embodiment illustrated in the preceding figures.

FIG. 8 shows a thermostatic mixing valve 101 for sanitary purposes as an alternative embodiment to the mixing valve 1 described hitherto.

The mixing valve 101 shares some of the components thereof with the mixing valve 1, namely the lower baseplate 10, the thermostatic cartridge 40 and the non-return valves 71 and 72. On the other hand, the mixing valve 101 includes an intermediate baseplate 120, an upper baseplate 130 and a flow member 150 which are correspondingly different from the components 20, 30 and 50, 60 of the mixing valve 1. In other words, the mixing valve 101 is designed to be obtained by replacing the components 20, 30 and 50, 60 by, the intermediate baseplate 120, the upper baseplate 130 and the flow member 150, respectively.

Just like each of the flow members 50 and 60, the flow member 150 is suitable for controlling the flow rate of a flow of mixed water crossing through the flow member 150 between a mixed water inlet of the latter and at least one mixed water outlet of the flow member 150. On the other hand, the flow member 150 differs from the flow members 50 and 60 in terms of number and/or type. Thereby, in the example of embodiment considered in the figures, the flow member 150 differs from the flow members 50 and 60 by the fact that the flow member 150 is only one and by the fact that the flow member 150 acts on the flow of mixed water passing therethrough so as to send same selectively either to the return duct for mixed water 13, i.e. towards the mixed water return duct 14 of the lower baseplate 10, where appropriate by also adjusting the flow rate of the mixed water flow. Thereby, the flow member 150 is e.g. a two-way selector, commonly referred to as an inverter in the sanitary field.

It should be understood that the intermediate 120 and upper 130 baseplates differ from the intermediate 20 and upper 30 baseplates, respectively, by features specific to the assembly and to the connection of the baseplates 120 and 130 with the flow member 150. Thereby, the intermediate 120 and upper 130 baseplates define, in particular downstream of the thermostatic cartridge 40, a flow architecture which is different from the flow architecture defined by the baseplates 20 and 30 of the mixing valve 1.

More generally, the mixing valves 1 and 101 are an example of a modular thermostatic mixing valve assembly for sanitary purpose, which shares the same lower baseplate 10 but which includes a plurality of different intermediate baseplates and a plurality of different upper baseplates, in order to adapt to the number and/or type of flow member(s) specific to a given mixing valve.

Finally, various fittings and variants of the mixing valves 1 and 101 described so far are conceivable. Examples include:

the connection between the mixed water outlet 52 of the flow member 50 and the mixed water return duct 13 of the lower baseplate 10 and/or the connection between the mixed water outlet 62 of the flow member 60 and the mixed water return duct 14 can have other embodiments than the embodiments illustrated in the figures; for example, rather than being connected by the mixed water discharge ducts 23 and 24 of the intermediate baseplate 20, the mixed water outlet 51, 61 of each of the flow members 50 and 60 can be connected directly to the corresponding mixed water return duct 13, 14 and/or in addition to the non-return valves 71 and 72, other elements acting on the flows of cold water and hot water in the conveying ducts 21 and 22 can be arranged inside the latter, such as filters.

The invention claimed is:

1. A sanitary thermostatic mixing valve, comprising:
   lower, intermediate and upper baseplates, which are assembled superimposed along an assembly axis and which each have lower and upper faces axially opposite each other, so that the upper face of the lower baseplate and the lower face of the intermediate baseplate are applied axially against each other and the upper face of the intermediate baseplate and the lower face of the upper baseplate are applied axially against each other,
   a thermostatic cartridge which:
      is assembled to at least one of the lower, intermediate and upper baseplates so that the thermostatic cartridge is actuatable from the upper face of the upper baseplate,
      provided with a cold water inlet and a hot water inlet, which are axial, and with a mixed water outlet, which is transverse to the assembly axis,
      is suitable for mixing a cold water flow from the cold water inlet of the thermostatic cartridge and a hot water flow from the hot water inlet of the thermostatic cartridge, for forming a mixed water flow sent to the mixed water outlet of the thermostatic cartridge, and
      incorporates a thermostatic regulation member, suitable for regulating the temperature of the mixed water flow by varying respective flow rates of the cold water flow and of the hot water flow, and
   one or more flow members which:
      are assembled to at least one of the lower, intermediate and upper baseplates so that the one flow member or each of the flow members is actuatable from the upper face of the upper baseplate,
      are each provided with a mixed water inlet, which is transverse to the assembly axis, and at least one mixed water outlet, and
      are each suitable for controlling a flow rate of a mixed water flow crossing through the flow member between the mixed water inlet and the at least one mixed water outlet of the flow member,
   wherein the lower baseplate delimits both a cold water inlet duct, a hot water inlet duct and at least one mixed water return duct, all of which open onto the upper face of the lower baseplate, the at least one mixed water outlet of the one or more flow members being connected to the at least one mixed water return duct,
   wherein the intermediate baseplate delimits a cold water conveying duct and a hot water conveying duct, which:
      each connect the lower and upper faces of the intermediate baseplate to each other,
      are, at the lower face of the intermediate baseplate, abutted against the cold water and hot water inlet ducts, respectively,
      are, at the upper face of the intermediate baseplate, abutted against the hot and cold water inlets, respectively, of the thermostatic cartridge, and
      are each internally fitted with a non-return valve,
   and wherein the upper face of the intermediate baseplate and the lower face of the upper baseplate jointly delimit a mixed water passage duct, which extends lengthwise transversely to the assembly axis so that, at one of the two opposite longitudinal ends of the mixed water passage duct, the mixed water passage duct is abutted against the mixed water outlet of the thermostatic cartridge, while at the other of the two opposite longitudinal ends of the mixed water passage duct, the mixed water passage duct is abutted against the mixed water inlet of the one flow member or of each of the flow members.

2. The mixing valve according to claim 1, wherein the intermediate baseplate is made of a plastic material.

3. The mixing valve according to claim 1, wherein the intermediate baseplate is designed to be demoldable along the assembly axis.

4. The mixing valve according to claim 1, wherein the upper baseplate is designed to be demoldable along the assembly axis.

5. The mixing valve according to claim 1, wherein the mixed water passage duct is formed axially recessed in the lower face of the upper baseplate.

6. The mixing valve according to claim 1, wherein the mixed water passage duct is formed axially recessed in the upper face of the intermediate baseplate.

7. The mixing valve according to claim 1, wherein the cold water and hot water conveying ducts extend parallel to the assembly axis from the lower face to the upper face of the intermediate baseplate.

8. The mixing valve according to claim 1, wherein the at least one mixed water outlet of the one flow member or of each of the flow members is, at the upper face of the intermediate baseplate, abutted against a mixed water outlet duct which:
   is delimited by the intermediate baseplate so as to connect the lower and upper faces of the intermediate baseplate,
   extends parallel to the assembly axis from the lower face to the upper face of the intermediate baseplate, and is, at the lower face of the intermediate baseplate, abutted against the at least one mixed water return duct.

9. The mixing valve according to claim 1, wherein the upper baseplate delimits mounting openings:
- in which the thermostatic cartridge and the one or more flow members are assembled,
- which connect the lower and upper faces of the upper baseplate to each other,
- and which extend parallel to the assembly axis from the lower face to the upper face of the upper baseplate.

10. A modular assembly for sanitary thermostatic mixing valve, comprising:
- a mixing valve, which is according to claim 1, the intermediate baseplate, the upper baseplate and the one or more flow members of the mixing valve forming a first intermediate baseplate, a first upper baseplate and one or more first flow members, respectively,
- one or more second flow members, which are suitable for controlling a flow rate of a mixed water flow crossing therethrough between a mixed water inlet and at least one mixed water outlet of the one second flow member or of each of the second flow members, and which differ, in number and/or type, from the one or more first flow members, and
- a second intermediate baseplate and a second upper baseplate, which can be assembled to the lower baseplate of the mixing valve in place of the first intermediate and upper baseplates, and which differ from the first intermediate and upper baseplates, respectively, by features specific to assembling and connecting the second intermediate and upper baseplates with the one or more second flow members.

* * * * *